(12) United States Patent
Hosseini et al.

(10) Patent No.: US 6,386,721 B1
(45) Date of Patent: May 14, 2002

(54) LIGHT PIPE HAVING ONE OR MORE INTEGRAL DIFFUSERS

(75) Inventors: Abbas Hosseini, Torrance; Gajendra Savant, Ranch Palos Verde, both of CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/349,280

(22) Filed: Jul. 8, 1999

(51) Int. Cl.[7] ................................................ F21V 8/00
(52) U.S. Cl. ...................... 362/31; 362/330; 362/333; 362/558
(58) Field of Search ............................. 362/26, 31, 330, 362/333, 339, 355, 558; 359/599; 349/64

(56) References Cited

U.S. PATENT DOCUMENTS

| | | | | |
|---|---|---|---|---|
| 4,183,628 A | * | 1/1980 | Laesser et al. | 349/64 |
| 4,802,737 A | * | 2/1989 | Denton | 359/599 |
| 5,384,658 A | * | 1/1995 | Ohtake et al. | 359/599 |
| 5,550,676 A | * | 8/1996 | Ohe et al. | 362/31 |
| 5,926,601 A | * | 7/1999 | Tai et al. | 349/64 |
| 6,011,601 A | * | 1/2000 | Kojima | 349/64 |

\* cited by examiner

*Primary Examiner*—Alan Cariaso
(74) *Attorney, Agent, or Firm*—Nilles & Nilles, S.C.

(57) ABSTRACT

A light pipe for a backlight assembly has a front surface and a back surface. The back surface includes an integral surface diffuser microstructure formed thereon. The front surface may also have an integral surface diffuser microstructure formed thereon as well. A backlight assembly has a reflective surface adjacent the back surface of the light pipe and a separate diffuser film layer disposed against the front surface. A pair of brightness enhancing film layers for collimating light are placed adjacent the diffuser film layer. A protective layer is disposed over the brightness enhancing film layers. The integral diffusers on the front and back surfaces of the light pipe significantly enhance the brightness and light distribution uniformity of the assembly without adding additional components or reducing other performance characteristics of the assembly.

30 Claims, 3 Drawing Sheets

LIGHT PIPE HAVING ONE OR MORE INTEGRAL DIFFUSERS

BACKGROUND OF THE INVENTION

1. Field of the Invention

The present invention relates generally to backlight assemblies for liquid crystal displays and the like, and more particularly to an improved total internal reflection light pipe for a backlight assembly.

2. Description of the Related Art

A standard backlight assembly for a liquid crystal display (LCD), such as for a lap top computer, is schematically shown in cross-section in FIG. 1. A backlight assembly 20 has a light propagating waveguide or total internal reflection (TIR) light pipe 22. The light pipe has one or more light sources 24 located along its edges. A commonly used light source is known as a cold cathode fluorescent light tube or CCFL tube and is placed along an edge or along opposed edges of the light pipe. The backlight assembly 20 also has a reflector or reflective layer 26 placed adjacent a back surface 28 of the light pipe. A number of optical elements 30 are disposed on the back surface of the light pipe.

In one known construction, the optical elements 30 are a plurality of silk screen, light colored dots that reflect light upward toward a front surface 32 of the light pipe. In an alternative known construction, the optical elements 30 are a plurality of elongate grooves formed in the back surface 28 of the light pipe 22 that direct light toward the front surface 32 at controlled angles. A separate diffuser film layer 34 is disposed adjacent the front surface 32 of the light pipe. The diffuser film 34 has a smooth back surface 36 facing the light pipe and a diffuser structure on a front surface 38 facing away from the light pipe.

A pair of brightness enhancing film (BEF™) layers 40 are located adjacent the diffuser film layer 34 and are oriented orthogonal relative to one another. THE BEF™ layers are available from 3M of St. Paul, Minn. and BEF is a TRADE-MARK OF 3M. One of the BEF™ layers turns light in one direction or plane and the other BEF™ turns light in another direction or plane 90° relative to the first BEF™ layer. Each BEF™ layer typically has a plurality of optical elements 42 such as prisms located on a front surface 44. The BEF™ layers together collimate light toward the direction normal to the light pipe front surface.

The backlight assembly also has a protective layer 50 disposed over the BEF™ layers to prevent damage to the optical elements. A display panel such as a LCD panel (not shown) is typically placed adjacent the protective layer.

The silk screen dot density on the back surface of the light pipe determines the amount of light projected upward toward the front surface of the light pipe and determines uniformity of light distribution. Two alternative dot density distributions are shown in FIGS. 3 and 4 and are discussed below. The higher the density of dots in a particular region on the light pipe back surface, the more light that is projected upward from that region toward the front surface. The front surface of the standard light pipe is left essentially smooth or flat.

Such a standard silk screen dot backlight assembly produces a light brightness output exiting the backlight. FIG. 2 illustrates one possible light output representation. The HLP and VLP curves represent the light intensity or brightness for only light exiting the light pipe in a horizontal or a vertical direction, respectively, across the light pipe. The brightness is fairly consistent both vertically and horizontally across the light pipe. This is achieved by having a higher dot density near the middle of the light pipe back surface and a lower dot density near the light sources, as shown in FIG. 3. More light thus travels to the middle of the light pipe before being reflected out. The HBL and VBL curves illustrated in FIG. 2 show the brightness for the entire backlight assembly including all of the components. The diffuser film and two BEF™ layers enhance the brightness near the center of the backlight where a viewer would be situated. The brightness near the edges of the backlight assembly is lower. The diffuser film and BEF™ layers collimate the light and therefore direct more light towards the middle of the light pipe and upon exiting the light pipe, direct more of the light toward the normal and not at an angle relative to the normal. Therefore, a majority of the light and thus the greatest brightness is near the center of the screen.

FIG. 4 illustrates an alternative dot density distribution on the back surface 28 of the light pipe 22 where the dots are more dense near the edges adjacent the light sources 24. FIGS. 5 and 6 illustrate graphs representing the brightness intensity measured along the horizontal axis and vertical axis across the light pipe and the backlight assembly, respectively identified as curves HLP, VLP, HBL, and VBL. As can be seen, the brightness along the vertical axis for both the light pipe and the backlight follows a curve having a general "M" shape. This is caused both by the intensity being brighter nearer the light sources and the increased dot density nearer the sources. The brightness along the horizontal axis for the light pipe is fairly consistent across the surface. This is because the distance from the light sources and the dot density are consistent in the horizontal direction for any plane across the light pipe. The brightness for the backlight along the horizontal axis is somewhat higher near the center of the backlight and lower near the edges due to collimation of the light by the BEF™ layers. By changing the dot density, the brightness can be altered over portions of the backlight exit surface.

A problem with these standard backlight constructions is that changing the dot density not only affects brightness but also reduces the uniformity of light distribution. The silk screen dots also reflect light in scattered directions such that some light is not directed to a desired area or is lost in the system altogether. The overall efficiency of the standard backlight is less than ideal.

Another problem with standard backlight constructions is caused by contact between the separate diffuser film layer and the front surface of the light pipe. No air gap exists between the two since both surfaces are flat and smooth. Both components also typically have very similar refractive indexes. Any light within the light pipe incident on the front surface within the light pipe at a high angle or nearly parallel to the front surface exits the light pipe at the same high angle. The diffuser film and the BEF™ layers cannot completely collimate some of this high angle light back to the normal direction relative to the front surface. This light is either misdirected away from viewers or lost within the system, greatly reducing the efficiency of the backlight.

SUMMARY OF THE INVENTION

The present invention is directed to an improved backlight assembly having a light pipe with at least an integral diffuser formed on the back surface of the light pipe. In a separate embodiment, a second integral diffuser is located on the front surface of the light pipe. The present invention simplifies the construction of the backlight assembly and reduces its manufacturing and component cost. The simpler backlight assembly construction of the invention provides improved overall brightness, improved light uniformity, and increased lighting efficiency.

One object of the present invention is to provide a backlight assembly having improved overall brightness characteristics. Another object of the present invention is to provide a backlight assembly with improved light distribution uniformity. A further object of the present invention is to provide a backlight assembly of a simpler construction that is easier to assemble and less costly to manufacture. A further object of the present invention is to provide a backlight assembly having all of these improved characteristics that can be used in place of standard backlight assemblies without any retrofit.

In one embodiment, a backlight assembly of the invention has a pair of light sources disposed along opposite edges of a TIR light pipe. A separate diffuser film layer is disposed adjacent a front surface of the light pipe. A pair of BEF™ enhancing layers brightness are disposed adjacent the diffuser film layer and together collimate light more towards the normal relative to the backlight assembly in both a horizontal and a vertical axis of the backlight. An upper mild diffuser film layer is disposed over the second brightness enhancing film, as an option, to further evenly distribute light exiting the second brightness film, but more importantly, to protect the optical elements of the brightness enhancing film layers. The light pipe also has a back surface opposite the front surface and a reflective surface adjacent the back surface. An integral surface diffuser microstructure is formed on the back surface of the light pipe. In another embodiment, another additional integral surface diffuser microstructure is formed on the front surface of the light pipe. Each integral diffuser surface has particular light distributing and directing characteristics that can vary depending upon the needs of the particular backlight assembly.

In one embodiment, the integral diffuser surface structure formed on the back surface of the light pipe has different light shaping and directing characteristics for different regions of the light pipe. The diffuser is formed so that it directs light in a particular predetermined pattern and wherein the pattern varies for different regions of the light pipe.

In one embodiment, the integral diffuser surface structure on the back surface of the light pipe is formed so that light is emitted in elliptical shaped patterns. In another embodiment, the integral diffuser surface structure is formed so that light is emitted in one elliptical pattern near the light sources and emitted in a different elliptical pattern near the center of the light pipe away from the light sources. In one embodiment, light is emitted from regions near the light sources having about a 95° horizontal by about a 15° vertical elliptical shape. Light is emitted in the center region having about a 95° horizontal by about a 30° vertical elliptical shape.

In one embodiment, the integral diffuser surface structure formed on the back surface of the light pipe produces an elliptical shaped light output that does not vary over the surface area of the light pipe. In one embodiment, the diffuser surface structures on the back surface produce an elliptical light output of about 95° horizontal by about 25° vertical over the entire surface area of the light pipe.

By utilizing the construction of the present invention, and by varying the output characteristics of the various integral diffuser surface structures, a backlight assembly is provided that has greater light distribution uniformity and yet provides improved overall brightness enhancement when compared to prior backlight assembly constructions.

These and other objects, features and advantages of the present invention will become apparent and better understood when considered in conjunction with the following detailed description and accompanying drawings. It should be understood, however, that while indicating preferred embodiments of the present invention, the following description is given only by way of illustration and not of limitation. Many changes and modifications can be made without departing from the scope and spirit of the invention and the invention includes all such modifications.

BRIEF DESCRIPTION OF THE DRAWINGS

A clear conception of the advantages and features of the present invention will become apparent upon referring to the drawings in which.

DETAILED DESCRIPTION OF THE PREFERRED EMBODIMENTS

Figure 7A:
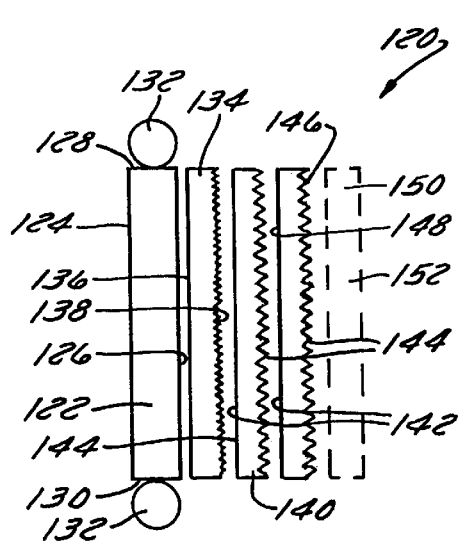
FIG. 7(A) illustrates a schematic cross section of one embodiment of a backlight assembly constructed in accordance with the present invention.

FIG. 7A illustrates one embodiment of a backlight assembly 120 constructed in accordance with the present invention and shown as a schematic cross-section. In general, the backlight assembly 120 is very similar in construction to the backlight 20 described above. The backlight assembly 120 has an internal reflection waveguide or light pipe 122. The light pipe 122 has a back surface 124, a front surface 126, a top edge 128, and a bottom edge 130. The backlight assembly 120 also has a pair of elongate light sources 132 disposed adjacent each of the top and bottom edges 128 and 130, respectively. The light sources 132 may be any type of desirable light source and in one embodiment are each a cold cathode fluorescent (CCFL) tube.

The backlight 120 next includes a separate diffuser film layer 134 disposed adjacent the front surface 126 of the light pipe 122. The diffuser film layer has a back surface 136 facing the front surface 126 of the light pipe 122. The diffuser film layer has a back surface 136 facing the front surface 126 of the light pipe 122. The diffuser film layer 134 also has a front surface 138. The diffuser film layer 134 includes a diffuser surface structure carried on the front surface 138. The backlight assembly 120 has a pair of BEF™ layers 140 disposed over the diffuser film layer 134. The BEF™ layers 140 include a back surface 142 facing the diffuser film 134. The BEF™ layers 140 also have a front surface 144 with a plurality of optical elements 146 thereon.

A final protective layer 150 is disposed over the BEF™ layers 140 in order to protect the BEF™ layers from damage. In one embodiment, the protective layer 150 includes a light shaping diffuser surface structure on one surface, although the primary purpose of this layer is to protect the underlying layers. The optional diffuser surface structure for this layer is discussed below in more detail.

In one embodiment, a diffuser can be formed or included on the protective layer 150 so as to shape light exiting therefrom. The diffuser, if provided, must have only small overlapping patterns such as a 2.5°×0.50° ellipse. As noted previously, the primary purpose of the protective layer 150 is to prevent damage to the underlying layers. Any surface structure or light shaping or diffusing characteristics added to the protective layer are merely for further enhancing the properties of the backlight assembly 120. A small angle diffuser sometimes assists in hiding any defects produced by the BEF™ layers. In this particular example, the diffuser, if included, emits light from the final protective layer 150 in only very precisely controlled patterns so as not to significantly alter the light direction or uniformity upon passing through the other layers. Each of the other layers perform the specific light shaping and/or directing task for which it is intended.

The light pipe 122 eliminates the need for adding silk screen dots or grooves to the back surface 124. Instead, according to the invention, the back surface 124 of the light pipe 122 includes an integral surface diffuser microstructure formed directly in the back surface by any one of a number of known processing methods invented by the assignee of the present invention. Some of these methods are disclosed in U.S. Pat. Nos. 5,534,386 and 5,609,939, both assigned to the assignee of the present invention, and pending U.S. patent application Ser. No. 08/800,872 to Savant et al. and Ser. No. 09/052,586 to Savant et al., both assigned to the assignee of the present invention.

The desired diffuser characteristics are first recorded in a photosensitive material, then replicated onto a metal shim. The metal shim can then be used as a master diffuser to form the structure in the back surface of the light pipe. In one method, the surface structure is hard-embossed or pressed into the surface of the light pipe 122 using the master. In another embodiment, the master can be used as a mold insert during an injection molding process to form the light pipe 122. Alternatively, the master can be used when making the injection mold to form the diffuser surface directly in the mold cavity. The diffuser master can otherwise be replicated or soft-embossed by placing epoxy on the back surface of the light pipe and pressing a master having the desired microstructure thereon onto the epoxy and the UV curing the epoxy directly into the material of the light pipe. The front surface 126 also has an optional surface diffuser microstructure formed integral therein. This surface structure also may be embossed, injection molded or otherwise replicated into the front surface of the light pipe 122 using the same methods.

In one embodiment of the invention, the diffuser surface structures in the back surface 124 and front surface 126 differ significantly from one another. By that, it is meant that the light output produced by the diffusers is significantly different.

Figure 7B:
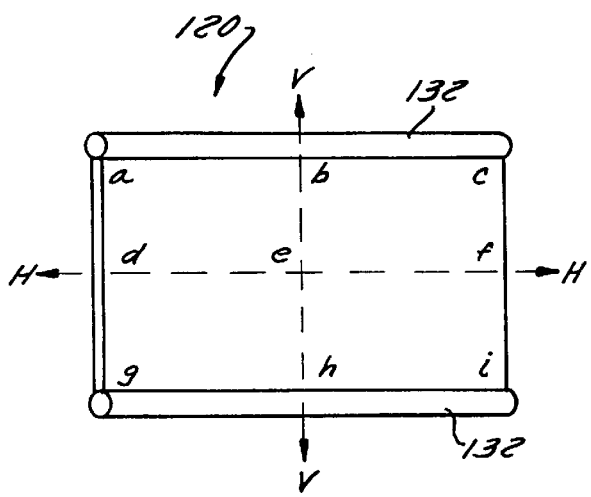
FIG. 7(B) illustrates a front schematic view of the backlight assembly of FIG. 7(A) showing various regions of the light pipe.
Figure 8:
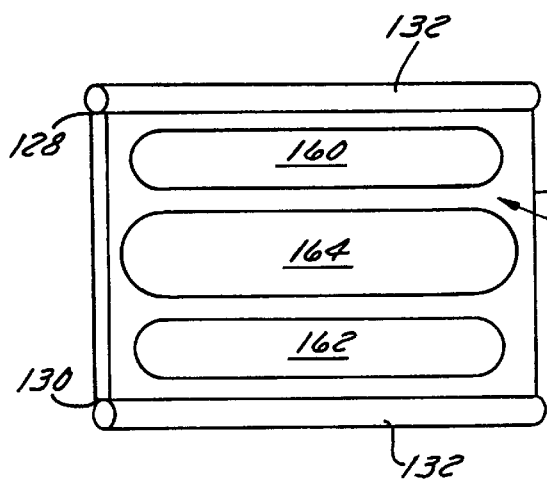
FIG. 8 illustrates a schematic back view of the light pipe illustrated in FIG. 7A.

FIG. 8 illustrates a schematic view of the back surface 124 of the light pipe 122 and also the two light sources 132 located at the top edge 128 and bottom edge 130. Also illustrated in FIG. 8 are three generally defined regions 160, 162, and 164 on the back surface 124. These three regions represent different areas of the back surface where the diffuser structures may vary, if desired, between regions. In the embodiment of FIG. 8, each of these regions has an identical diffuser surface structure producing identical light ouput characteristics. Though three regions are shown, it is to be understood that the number of regions can vary considerably without departing from the scope of the invention. Also, the arrangement of the regions can also vary considerably. For example, FIG. 7(B) illustrates nine regions denoted A–J which could each have a different surface diffuser formed thereon. FIG. 7(B) also denotes a horizontal reference axis H and a vertical reference axis V to assist in the remainder of this description.

As shown in FIG. 8, the regions 160 and 162 are disposed adjacent the light sources 132 near the top and bottom edges 128 and 130 respectively. Central region 164 is disposed between the regions 160 and 162 and defines generally the middle portion of the light pipe 122. Each of the regions 160, 162 and 164 has a surface diffuser microstructure molded or otherwise replicated thereon on the back surface 124 of the light pipe 122. The diffuser surface structures of each of the three regions are identical to one another producing the same light output shape and contour.

As an example, the diffuser is formed so as to diffuse and to direct light in a particular manner, such as producing an elliptical light output for each ray of light passing through any given point of the diffuser. An elliptical diffuser designed to produce a light output on the order of about 90° in the horizontal direction and about 25° in an orthogonal vertical direction was tested and formed on the back surface 126. Such a diffuser yields a long and relatively narrow light output pattern of 95° by 25° oriented horizontally for a ray of light emitted from any given point on the back surface 124. In practice, if the diffuser is manufactured to produce an elliptical output of 95° by 25°, the 95° component can sometimes vary as by much as between 80° and 120°. The vertical 25 component can sometimes vary by as much as between 5° and 30° when the surface structure is manufactured and replicated.

It is preferred that the long component of the elliptical shaped output extends horizontally across the light pipe 122. The shorter dimension of the elliptical output is preferably arranged vertically according to the grid shown in FIG. 7(B).

The particular diffuser surface structure can vary without departing from the spirit and scope of the present invention in order to produce different light shaping and directing capabilities. The elliptical 95° by 25° shaped output has been found to produce highly desirable results as discussed below. Additionally, the entire back surface of the light pipe 122 including each of the regions 160, 162, and 164 has the identical diffuser surface so that the bottom surface yields the same light output over its entire surface.

Figure 11:
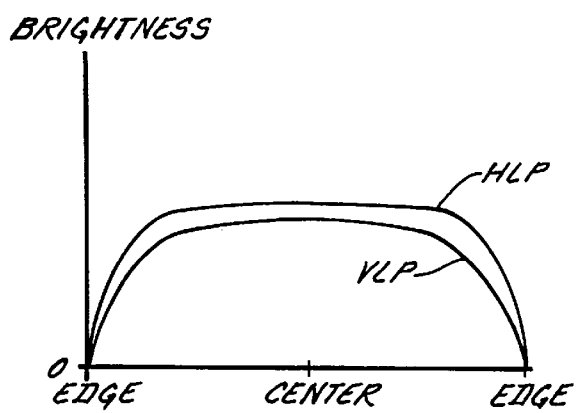
FIG. 11 illustrates a graphic representation of the brightness or light output for only the light pipe of the backlight of FIG. 7A but having different diffuser characteristics.
Figure 12:
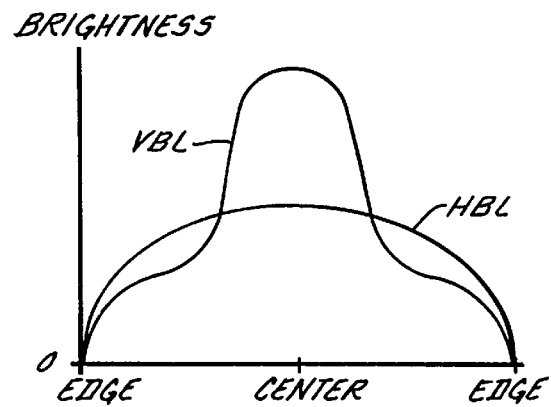
FIG. 12 illustrates a graphic representation of the brightness or light output for the entire backlight assembly of FIG. 7A but including the light pipe represented by FIG. 11.

The three regions 160, 162, and 164 can alternatively have different diffuser characteristics. In one embodiment, a 95° by 30° elliptical diffuser was molded into the central region 164 and 95° by 15° elliptical diffusers were molded into the outer regions 160 and 162. FIGS. 11 and 12 represent the light output over the height and width of the backlight for such a variable diffuser construction.

Also, as discussed above, the front surface 126 of the light pipe 122 has an optional integral diffuser surface structure formed directly therein. This particular diffuser surface structure can also vary considerably to produce different light output characteristics as desired. As an example, the surface diffuser microstructure on the front surface 126 preferably yields a circular light output pattern so that light emanating from any given point of the diffuser yields a cylindrical conical light output. As an example, the circular output or cone can have an angle of about 1° if desired. In practice, a circular diffuser having such a small output angle can vary from about 0.5° to about 5°. Any light exiting the light pipe through the front surface at virtually any angle relative to the front surface is diffused to a conical output pattern in that particular direction.

Figure 9:
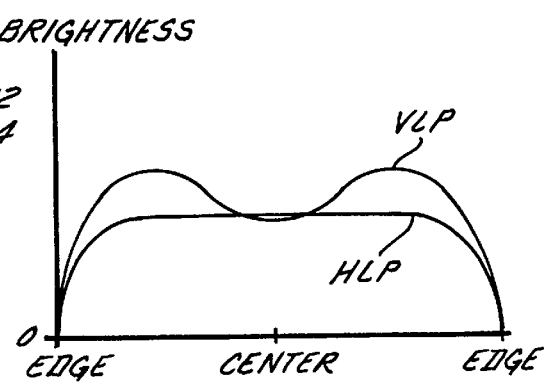
FIG. 9 illustrates a graphic representation of the brightness or light output for only the light pipe of the backlight illustrated in FIG. 7A.

The particular surface structure characteristics of both of the diffuser surfaces on the back surface 124 and the front surface 126 can be varied to alter the light output and output characteristics of the light pipe 122. FIG. 9 illustrates the light output or brightness of the light pipe 122 including the 95° by 25° elliptical diffuser in all three regions of the back surface and including a circular diffuser of about 1° in the front surface. The horizontal brightness curve HLP for only the light pipe is fairly consistent across the entire width of the light pipe. The vertical light output or brightness curve VLP for only the light pipe represents a variable brightness having an M shaped output similar to the prior art structure described previously with regard to FIG. 6. The constant surface diffuser structure over the back surface area of the light pipe 122 results in greater brightness near the light sources 132 and less brightness near the center of the light pipe, similar to the prior art backlight represented in FIG. 6. The light is most intense near the edge regions 160 and 162 of the light pipe and less intense near the middle region 164 of the light pipe.

Figure 10:
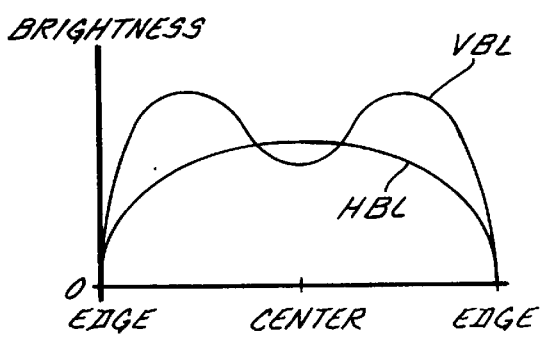
FIG. 10 illustrates a graphic representation of the brightness or light output for the entire backlight assembly illustrated in FIG. 7A.

FIG. 10 illustrates the light output brightness for the entire backlight assembly package including all the components. FIG. 7(A) illustrates the additional film layers added to the backlight assembly 120 on the front of the light pipe 122. These include the diffuser film layer 134 disposed over the front surface 126 of the light pipe 122, the BEF™ layers 140 and the protective layer 150. The addition of each layer further directs light more toward the normal direction to increase the brightness of light exiting the backlight. The curve HBL in FIG. 10 represents the horizontal brightness component for light across the backlight assembly. The additional layers collimate and redirect much of the light more toward the normal direction resulting in a little more brightness near the center of the backlight assembly but essentially a consistent curve. The curve VBL of FIG. 10 represents the brightness component across the backlight assembly in the vertical direction. The additional layers also collimate light in the vertical direction so that more of the light is concentrated about the two peaks of the M shaped curve. Such a two peak response curve is sometimes desirable for multiple viewer workstations or the like.

The diffuser film layer 134 includes a smooth back surface 136 and a front surface 138 having the diffuser structure carried thereon. The diffuser structure again can vary considerably to produce many different light output characteristics but in one embodiment is similar to the elliptical diffuser surface structure described for the back surface 124. The elliptical surface structure of the diffuser layer 134 assists in further diffusing or evenly distributing light over the entire surface area of the backlight assembly 120 in the horizontal direction without spreading the light output too much in the vertical direction which would otherwise reduce the concentration at the peaks of the VBL curve.

One problem caused by the construction of the standard backlight assembly 20 is that the back surface of the diffuser layer 34 and the front surface of the light pipe 22 are typically both smooth or very flat. When these two layers are placed next to one another, there is very little or air no gap between the two layers. Light exiting the front surface of the light pipe 22 is at a very large angle relative to the normal and hence diverges nearly parallel to the front surface of the light pipe. This light is either lost or cannot be collimated back to near the normal of the backlight assembly. With the present invention, the integral surface diffuser on the front surface 126 of the light pipe 122 essentially creates a rough surface against which the diffuser layer 134 rests. The rough diffuser surface creates an air gap between the two components. The refractive index of air is significantly less than the refractive index of the light pipe, typically made from a polycarbonate material or the like. The air gap thus creates a difference in the refractive index so that light that would otherwise exit the light pipe at a very sharp angle is instead diverted back into the light pipe until it exits at an angle more toward the normal to the front surface 126. Instead of being lost or misdirected, this light is directed outward from the light pipe more near the normal to the exit surface and increases the brightness and efficiency of the backlight assembly.

The following charts represent readings taken from nine points A–J on a backlight assembly as shown in FIG. 7B. Chart 1 represents brightness readings or luminance in Nits (candela per meter) taken from a backlight assembly 120 where each region 160, 162, and 164 has the same integral diffuser characteristics.

| CHART 1 | |
|---|---|
| Location | Luminance (Nits) |
| A | 2100 |
| B | 2020 |
| C | 1950 |
| D | 1190 |
| E | 1130 |
| F | 1175 |
| G | 2190 |
| H | 2300 |
| J | 2240 |
| Average | 1811 |
| Center Brightness | 1130 |
| Uniformity | 49% |

The highest brightness is located at the regions A and H, which are adjacent the light sources relative to the vertical axis. The brightness at the center region E of the backlight assembly 120 is the lowest brightness recording. The brightness curves in the vertical direction are therefore M shaped according to this data and FIG. 10. The brightness curves in the horizontal direction are relatively consistent according to this data and FIG. 10. The highest brightness and average brightness are relatively high, 2300 and 1811 Nits, respectively.

Figure 1:
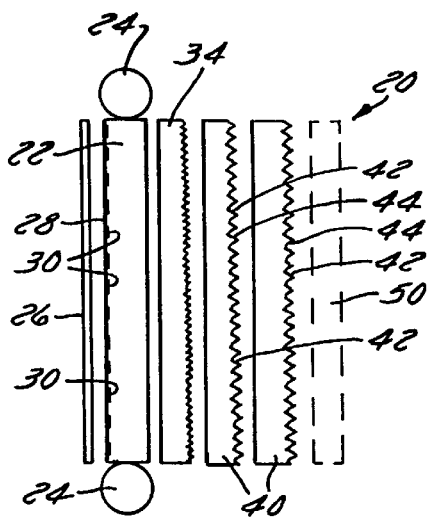
FIG. 1 illustrates a schematic cross-sectional view of a standard backlight assembly construction.
Figure 2:
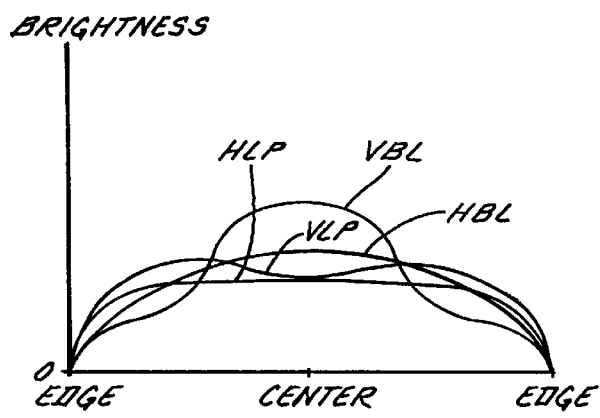
FIG. 2 illustrates a graphic representation of one possible light output from the backlight assembly of FIG. 1 and the light output from only the light pipe of the backlight assembly of FIG. 1.
Figure 3:
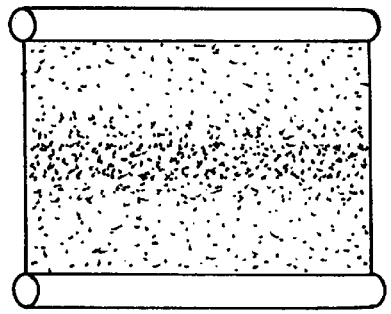
FIG. 3 illustrates a schematic bottom plan view of the light pipe and showing the silk screen dot density for the light pipe of the standard backlight assembly represented by the graph of FIG. 2.
Figure 4:
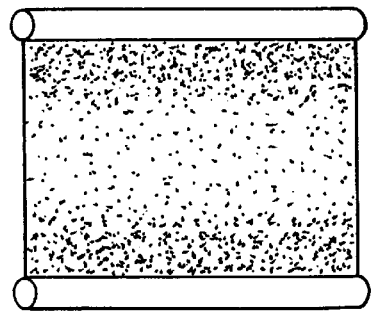
FIG. 4 illustrates a schematic bottom plan view of a light pipe and showing an alternative silk screen dot density for a standard backlight assembly.
Figure 5:
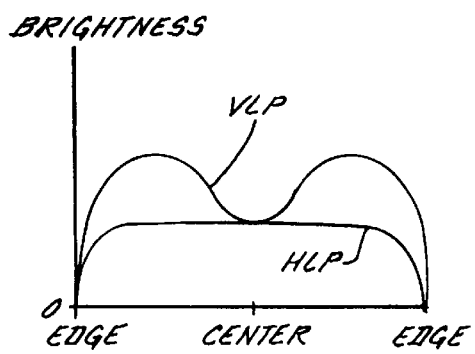
FIG. 5 illustrates a graphic representation of the light output for only the light pipe of FIG. 4.
Figure 6:
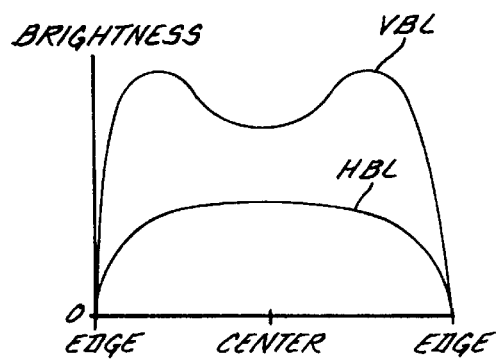
FIG. 6 illustrates a graphic representation of the light output for a standard backlight assembly incorporating the light pipe construction of FIG. 4.

Chart 2 represents readings taken from the same nine regions A–J but from a standard backlight assembly shown in FIG. 1 and represented by the graphs of FIGS. 2, 5 and 6. The standard backlight also had an increased silk screen dot density near the center of the backlight assembly parallel to the light sources.

| CHART 2 | |
| --- | --- |
| Location | Luminance (Nits) |
| A | 1246 |
| B | 1341 |
| C | 1279 |
| D | 1284 |
| E | 1540 |
| F | 1381 |
| G | 1234 |
| H | 1427 |
| J | 1322 |
| Average | 1339 |
| Center Brightness | 1540 |
| Uniformity | 80% |

As can be seen, the highest brightness reading is at the center region E, but is only 1,540 Nits. The average brightness reading of 1339 Nits is much lower than for the backlight 120 of the invention. The curves are much more flat because the silk screen dots do not provide any light directing effects.

Chart 3 represents brightness readings taken from a backlight assembly 120 but with different diffuser characteristics at different regions 160, 162, and 164, as described above (95°×15° edges and 95°×30° center). The wider vertical ellipse angle in the center region essentially flattens the M-shaped vertical curves of FIG. 10.

| CHART 3 | |
| --- | --- |
| Location | Luminance (Nits) |
| A | 1885 |
| B | 1870 |
| C | 1920 |
| D | 1610 |
| E | 1545 |
| F | 1690 |
| G | 1875 |
| H | 1900 |
| J | 1910 |
| Average | 1801 |
| Center Brightness | 1545 |
| Uniformity | 80% |

The average overall brightness of 1801 Nits is a significant improvement over a standard backlight construction. The brightness at each particular region is fairly high thus providing a flatter more even brightness distribution while still significantly increasing overall brightness of the backlight.

Though the invention is described referring to particular embodiments, many changes and modifications may be made to the invention as described without departing from the spirit and scope thereof. The scope and spirit of these changes and modifications will become apparent from the appended claims. The scope of the invention is therefore intended only to be limited by the appended claims.

What is claimed is:

1. A light pipe for a backlight assembly, the light pipe comprising:
    a front surface;
    a back surface opposite the front surface; and
    an integral diffuser including at least one region of surface micro-structures formed in the back surface, wherein the integral diffuser comprises a central region of surface structures having at least one lateral edge and a lateral region of surface micro-structures adjacent to each lateral edge.

2. The light pipe of claim 1, wherein all the surface micro-structures produce identical light output characteristics when light is directed through the light pipe.

3. The light pipe of claim 1, wherein each region produces different light output characteristics when light is directed through the light pipe.

4. The light pipe of claim 1, wherein the surface micro-structures produce elliptical light output when light is directed through the light pipe.

5. The light pipe of claim 4, wherein the elliptical light output from at least one of the regions is between approximately 80°–120° horizontal and between approximately 5°–30° vertical over the entire surface area of the light pipe when light is directed through the light pipe.

6. The light pipe of claim 5, wherein the elliptical light output from at least one of the regions is approximately 95° horizontal and approximately 25° vertical over the entire surface area of the light pipe when light is directed through the light pipe.

7. The light pipe of claim 1, further comprising an integral diffuser including at least one region of surface micro-structures formed on the front surface.

8. The light pipe of claim 7, wherein the integral diffuser in the front surface has at least two regions of surface micro-structures.

9. The light pipe of claim 7, wherein the surface micro-structures formed in the front surface produce circular light output when light is directed through the light pipe.

10. The light pipe of claim 7, wherein the circular light output has an angle between approximately 0.5° and 5.0° when light is directed through the light pipe.

11. A backlight assembly for a display comprising:
    a light pipe including;
    a front surface,
    a back surface, and,
    an integral surface diffuser including at least one region of surface micro-structures formed in the back surface of the light pipe wherein the integral diffuser comprises a central region of surface structures having at least one lateral edge and a lateral region of surface micro-structures adjacent to each lateral edge; and,
    at least one light source located adjacent an edge of the light pipe.

12. The backlight assembly of claim 11, wherein all the surface micro-structures produce identical light output characteristics when light is directed through the light pipe.

13. The backlight assembly of claim 11, wherein each region produces different light output characteristics when light is directed through the light pipe.

14. The backlight assembly of claim 11, wherein the surface micro-structures produce elliptical light output when light is directed through the light pipe.

15. The backlight assembly of claim 14, wherein the elliptical light output from at least one of the regions is about 95° horizontal and 25° vertical over the entire surface area of the light pipe when light is directed through the light pipe.

16. The backlight assembly of claim 11, further comprising a diffuser layer disposed adjacent the front surface of the light pipe.

17. The backlight assembly of claim 16, further comprising at least one brightness enhancing layer disposed adjacent the diffuser layer.

18. The backlight assembly of claim 17, further comprising a protective layer wherein the at least one brightness enhancing layer is disposed between the protective layer and the diffuser layer.

19. The backlight assembly of claim 17, wherein each brightness enhancing layer includes a plurality of integral optical elements.

20. The backlight assembly of claim 11, further comprising an integral surface diffuser including at least one region of surface micro-structures formed in the front surface of the light pipe.

21. The backlight assembly of claim 20, further comprising a diffuser layer disposed adjacent the front surface of the light pipe, and at least one brightness enhancing layer disposed adjacent the diffuser layer.

22. The backlight assembly of claim 21, wherein an air gap is formed between the surface micro-structures formed in the front surface of the light pipe and the diffuser layer disposed adjacent the front surface of the light pipe.

23. The backlight assembly of claim 22, wherein the surface micro-structures formed in the front surface produce circular light output when light is directed through the light pipe.

24. The backlight assembly of claim 23, wherein the circular light output has an angle between approximately 0.5° and 5.0° when light is directed through the light pipe.

25. The backlight assembly of claim 16, further comprising a reflective layer disposed adjacent the surface microstructures formed in the back surface of the light pipe.

26. A method of enhancing the uniformity and brightness of light output produced by a backlight assembly comprising:

providing a backlight assembly including;
   a light pipe having;
   a front surface,
   a back surface, and,
   an integral surface diffuser including at least one region of surface micro-structures formed in the back surface of the light pipe wherein the integral surface diffuser comprises a central region of surface structures having at least one lateral edge and a lateral region of surface micro-structures adjacent to each lateral edge.

27. The method of claim 26, further comprising, an integral surface diffuser including at least one region of surface micro-structures formed in the front surface of the light pipe, and, a diffuser layer disposed adjacent the front surface of the light pipe; wherein an air gap is formed between the surface micro-structures formed in the front surface of the light pipe and the diffuser layer disposed adjacent the front surface of the light pipe.

28. The method of claim 27 wherein each region in the back surface produces an elliptical light output at an angle approximately 95° horizontal and approximately 25° vertical; and each region in the front surface products a circular light output of approximately 1° when light is directed through the light pipe.

29. The method of claim 26, wherein the central region produces an elliptical light output of approximately 95° by 15° and each lateral diffuser produces an elliptical output of approximately 95° by 25° when light is directed through the light pipe.

30. The method of claim 29, further comprising an integral surface diffuser including at least one region of surface micro-structures formed in the front surface of the light pipe, wherein the surface microstructures in the front surface produce a circular light output of between approximately 0.5° and 5.0° when light is directed through the light pipe.

\* \* \* \* \*